(12) United States Patent
McCloskey

(10) Patent No.: US 8,605,938 B2
(45) Date of Patent: Dec. 10, 2013

(54) MOTION-BASED IMAGE WATERMARKING

(75) Inventor: Scott McCloskey, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 381 days.

(21) Appl. No.: 13/013,345

(22) Filed: Jan. 25, 2011

(65) Prior Publication Data

US 2012/0189157 A1 Jul. 26, 2012

(51) Int. Cl.
*G06K 9/00* (2006.01)
*H04N 5/228* (2006.01)

(52) U.S. Cl.
USPC ........................................ 382/100; 348/222.1

(58) Field of Classification Search
USPC .................. 382/100; 348/208.12, 222.1, 239
See application file for complete search history.

(56) References Cited

U.S. PATENT DOCUMENTS

| | | | |
|---|---|---|---|
| 6,570,613 B1* | 5/2003 | Howell | 348/219.1 |
| 2003/0012404 A1 | 1/2003 | Matsumura et al. | |
| 2004/0071311 A1* | 4/2004 | Choi et al. | 382/100 |
| 2009/0244300 A1 | 10/2009 | Levin et al. | |
| 2010/0026826 A1* | 2/2010 | Lee et al. | 348/222.1 |
| 2010/0322463 A1* | 12/2010 | Celik | 382/100 |

FOREIGN PATENT DOCUMENTS

EP 1592244 A1 11/2005

OTHER PUBLICATIONS

"European Application Serial No. 12151652.0, Response filed Oct. 13, 2012 to Office Action mailed Jun. 8, 2012", 6 pgs.
"European Application Serial No. 12151652.0, Office Action mailed Jun. 8, 2012", 6 pgs.
"European Application Serial No. 12151652.0, European Search Report mailed May 2, 2012", 4 pgs.
Agarwal, P, et al., "Blind Robust Watermarking of 3D Motion Data", *ACM Trans. Multimedia Comput.* vol. 6, No. 1, (Feb. 2010), 1-32.
Roland, G., et al., "Visual Vehicle Egomotion Estimation using the Fourier-Mellin Transform", *Proceedings of the 2007 IEEE Intelligent Vehicles Symposium*, (2007), 450-455.

\* cited by examiner

*Primary Examiner* — Timothy J Henn
(74) *Attorney, Agent, or Firm* — Schwegman, Lundberg & Woessner, P.A.

(57) ABSTRACT

A computer implemented method and system including providing a motion pattern to an imaging device; and acquiring an image with the imaging device, wherein the image has embedded signals representative of the motion pattern and the embedded signals provide an authenticating watermark. The embedded signals can comprise spectrum information selected from duration, dimension, acceleration and velocity.

25 Claims, 4 Drawing Sheets

MOTION-BASED IMAGE WATERMARKING

BACKGROUND

Digital watermarking (hereinafter "watermarking") allows electronic content creators to attach digital information (e.g., a pattern and/or text and/or cryptographic key containing, for example, copyright, authorship, ownership, usage information) to their electronic content to identify themselves as the creator of the content. This information can be recovered even if the watermarked content is altered or degraded. A watermark thus provides proof of ownership.

When decoded, a watermark can be used to determine if the electronic content has been copied, altered, and/or distributed without permission. Unlike encryption used to restrict access to data, watermarking provides evidence of authorship and usage. As with data hiding, generally, the watermark remains with the media through typical content-preserving manipulations, e.g. cropping, compression, and so forth. In contrast to data hiding, however, the watermark cannot be accessed by an unauthorized user.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that structural, logical and electrical changes may be made. The following description of example embodiments is, therefore, not to be taken in a limited sense, with the scope being defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating directly on an imaging system, such as a camera or on a computer system, such as a personal computer, server or other computer system.

Digital imaging devices, such as digital single lens reflex (SLR) cameras, may embed fragile watermarks in an image, such that subsequent editing of the image on a computer destroys the watermark, thus indicating that post-processing has taken place. Watermarks can also be used to identify specific imaging devices. The power of an effective watermarking system, however, lies in its degree of robustness. Robustness ensures that the embedded watermark cannot be removed or tampered without destroying or at least degrading the quality of the host image.

Embodiments described herein include generating robust authenticating (digital) watermarks through movement of a lens, sensor or both. In this way, the exact trajectory of the lens and/or sensor can be used as a unique and verifiable watermark which can identify the owner/acquirer of the image. This approach includes both visible and invisible watermarks (not visible to the naked human eye).

In one embodiment, the method begins with a pre-capture step in which a user provides a motion pattern to an imaging device. During the capture step, movement of a camera component (lens, sensor or both) occurs according to the motion pattern selected. In the post-capture step, the image containing the motion pattern is verified by spectral analysis, such as with image statistics in the Fourier domain.

Figure 1:
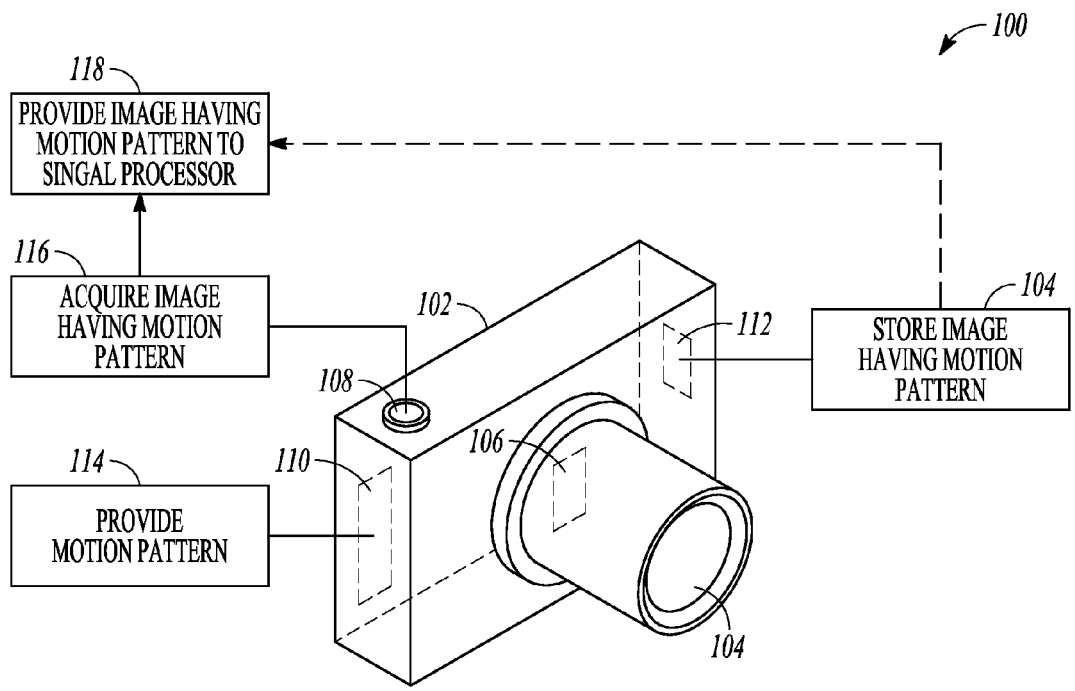
FIG. 1 is a block diagram of a watermarking system for image verification using an imaging device according to an example embodiment.

FIG. 1 is a block diagram 100 illustrating a watermarking system for image verification using an imaging device 102. The imaging device 102 can be any conventional type of digital SLR camera modified to accept input of a motion pattern as described herein and to provide the desired motion during image capture. The imaging device 102 can also be custom designed to perform the desired functions. In the embodiment shown in FIG. 1, the imaging device 102 has a 104 (such as a compound lens comprising an array of simple lenses or elements or a single lens), a sensor 106 a shutter release 108, a motion pattern receiver 110, and image storage 112, such as a memory card.

In this embodiment a motion pattern, such as a pre-defined sequence of motions having a particular duration and/or dimension and/or velocity and/or acceleration, is provided 114 into the motion pattern receiver 110.

The motion pattern can be provided 114 by inputting information (i.e., instructions) into the motion pattern receiver 110 on the imaging device 102; and translating the information into the motion pattern or by generating a motion pattern in an Internet-based central database (which can be unique to the user or entity); and communicating the motion pattern using Bluetooth technology, USB technology, a flash drive, wireless network connection or removable memory chip, such as a Secure Digital (SD), microSD, compact flash, and the like). USB technology or a flash drive) to the imaging device 102. In one embodiment, the imaging device 102 has Internet access and the communicating occurs using a wired or wireless connection to the Internet. In one embodiment, the motion pattern is generated and input through a direct interface with the imaging device 102.

The information or instructions can take a variety of forms, such as a key or pass phrase unique or private to a user which has previously been configured during a separate watermark registration process utilizing software (not shown) located on the imaging device 102 or on a separate device or centralized database as discussed above. The software then accepts these instructions and translates them into a particular motion pattern having specific starting and ending points at a predefined location within the image. In one embodiment, a passphrase may be translated into a hex key as is known in the art, with substrings of the key used to generate the motion. For example, with a key of the form "XXXXYYYYY," the "XXXX" may be used to specify motion direction and the "YYYYYY" may be used to specify motion velocity. In this way, an image having a motion pattern as a result of movement of the sensor 106, lens 104 or both can be acquired 116.

In embodiments in which the motion pattern is acquired by movement of the lens 104 alone, the lens 104 is a compound lens containing multiple simple lenses and at least one of the simple lenses in the lens 104 is moved in a plane parallel to the sensor 106. The movement can be varied by duration and/or dimension and/or velocity and/or acceleration, with the level or amount of resulting "blur extent" proportional to the velocity of the movement times the exposure time for the acquired image.

This movement can be produced by any suitable means, such as with a motion detector, software and appropriate hardware, such as one or more magnets in communication with the motion detector. Use of a motion detector is a known means for counteracting motion of an imaging device, such as a camera, during exposure of an image. In one embodiment the at least one simple lens is translated parallel to the sensor 106 using a real-time position control algorithm generated by the software (not shown) as a result of the user input 114. In another embodiment, the sensor 106 is moved relative to the lens 104, which remains stationery.

In one embodiment, the image having a motion pattern is provided 118 to a signal processor for spectral analysis, thus providing image verification for the acquired image. The signal processor can be located on the imaging device 102 or on a separate computer or processor with which the imaging device 102 can communicate. In one embodiment, the image having the motion pattern can be stored in the image storage 112 which may be an internal component of the imaging device 102 capable of storing one or more images. In one embodiment, the image storage 112 is a removable memory card capable of storing several gigabytes or more of images. In this embodiment, after the desired images are captured, the memory card can be removed from the imaging device 102 to allow for transfer of the images directly into a signal processor or can remain within the imaging device 104 during transfer of the images to an external processor.

Figure 2:
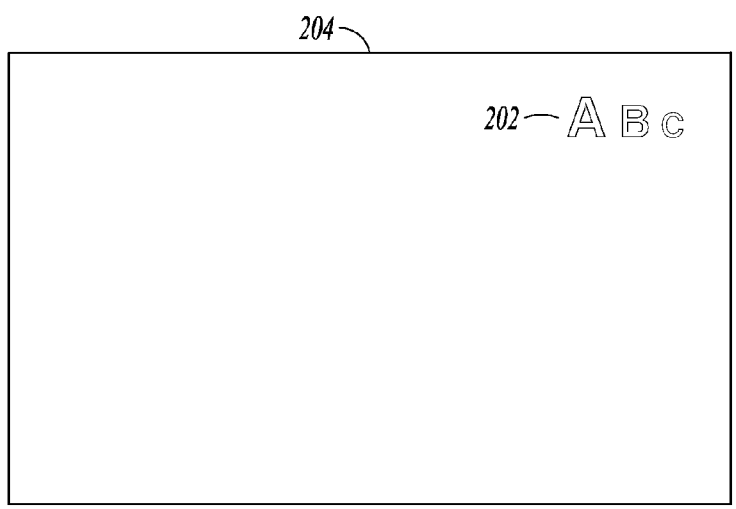
FIG. 2 is a schematic diagram illustrating a system-level overview of an image embedded with a motion pattern according to an example embodiment.

Referring also to FIG. 2, the motion pattern can produce a watermark 202 ("ABC" shown for exemplary purposes only) which is visible within an image 204. Such a motion pattern 202 (visible) can be produced by providing a sufficiently "large" (in size) and/or "long" (in time) and/or "slow" (in speed) motion of the lens 104 and/or sensor 106 during image acquisition. The appearance of a watermark as visible is also dependent on other image acquisition settings, such as the ISO speed, shutter speed, lighting, subject matter being imaged, resolution or quality of the image, degree of zoom when viewing the image, and the like. If the subject matter includes a light source, such as a bright light or a reflection, for example, a local effect around the light source may cause the watermark (and inherent motion blur) to be localized in that area. The location of the watermark within the acquired image, together with other factors, may also render it visible. In one embodiment, a visible watermark affects at least 10% of the pixels in the acquired image and/or is active during the exposure for at least 10% of the time.

In embodiments providing an invisible watermark, a "smaller" (in size) and/or "shorter" (in time) and/or "faster" (in speed) motion could be applied that, while not visible to the human eye, would have measurable effects on image statistics. The ability to create an invisible watermark is also dependent on other image acquisition settings, such as the ISO speed, shutter speed, lighting, resolution or quality of the image, and the like. Additionally, the location of the watermark within the acquired image, together with other factors, may also render it invisible. For example, a given motion sequence can create certain features in the Fourier domain related to duration and/or direction and/or dimension and/or velocity and/or acceleration.

Since the motion pattern introduces a global shift of the image, the statistical effects should be substantially uniform across the image. In some embodiments, there may be regions of the image where the statistics of the invisible watermark are easier or hard to observe (based on image content in that region). Although an invisible watermark is creating motion blur, such motion is limited or minute in scale, particularly when within a high resolution image (e.g., greater than about three (3) megapixels (MP)). In one embodiment, an invisible watermark is active during the exposure less than 10% of the time, such as less than 5% or less than 1%, including any range there between. In one embodiment, the invisible watermark is active for less than 0.5% of the exposure time. In one embodiment, a single lens element in the compound lens 102 is programmed to move within 2-3 milliseconds to create the desired watermark.

Therefore, although the motion pattern may include, for example, a sinusoidal pattern, a parabolic pattern, a simple harmonic motion, as well as a sweep motion in one direction which can progressively decelerate and then accelerate in an opposite direction, the motion patterns provided herein are useful on all types of images, including those having some or all of the subjects in motion, including at different rates, and still images, with no noticeable degradation of image quality. This is in contrast to conventional systems in which a motion pattern may be provided to remove image blur (i.e., deblur). As such, there is no need in the various embodiments described herein to intentionally blur an image, deconvolute the resulting blurred scene and generate a reconstructed image as in the prior art. Instead the authenticating watermark resulting from the unique motion pattern provided is produced independent of the image subject and is invisible in the various embodiments.

Thus, in contrast to after-the-fact watermarking (post image acquisition), which requires separate hardware and software from the image device, the watermarks described herein contain recoverable data applied during image capture, such that they are inherently in the image. As such, no computation is used after the fact to apply a watermark.

In one embodiment, the imaging device 102 is a digital video camera. In such embodiments, the higher compression of a video image as compared to a still image would need to be considered. In one embodiment, the same lens motion is used for each frame of a video, with multiple frames acquired to provide a robust estimate of the statistics. In an alternative embodiment, multi-frame motion patterns are used. Such motion patterns could take the form of varying instructions for each frame. One exemplary motion pattern might be, for example: movement of x meter/sec in direction "A" on frame 1, movement of y meter/sec in direction "B" on frame 2, and so forth.

Figure 3:
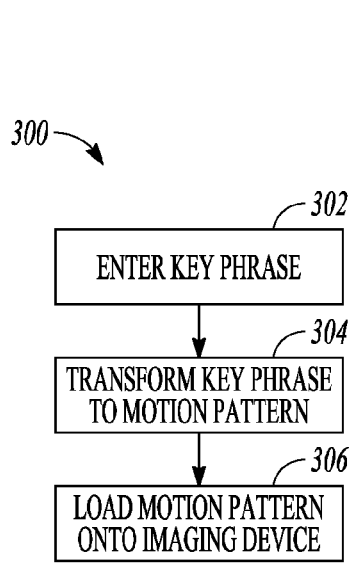
FIG. 3 is a block flow diagram of a method of inputting a motion pattern for image verification according to an example embodiment.

FIG. 3 illustrates a pre-capture method 300 which includes an enter (or input) key phrase step 302 as described above, followed by a transform key phrase to motion pattern step 304, and a load motion pattern onto imaging device step 306, performed by software on the imaging device.

Figure 4:
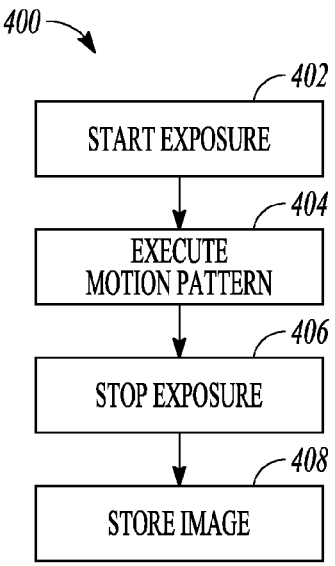
FIG. 4 is a block flow diagram of a method of acquiring an image having a motion pattern according to an example embodiment.

FIG. 4 illustrates an image capture (image acquisition) method 400 which includes a start exposure step 402 which typically starts when the shutter release is pushed, an execute motion pattern step 404 (as the shutter is open), a stop exposure step 406 (once the image has been acquired), followed by a store image step 408 (such as on the imaging device or on a memory card in the imaging device).

Figure 5:
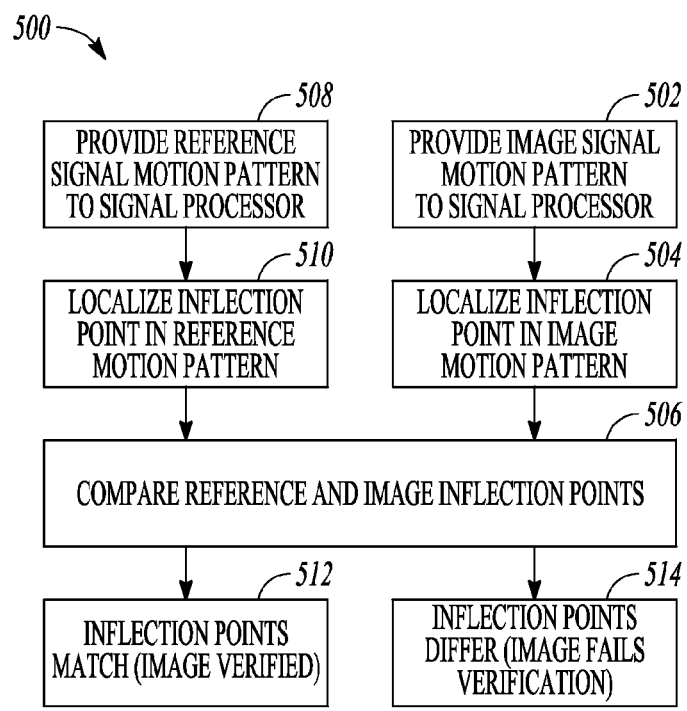
FIG. 5 is a block flow diagram of a method of post-capture image verification according to an example embodiment.

FIG. 5 illustrates a post-capture method 500 which occurs in a signal processor and includes a provide image containing an image signal motion pattern to signal processor step 502 and a localize inflection point in image motion pattern step 504. The method 500 further includes a provide reference signal motion pattern to signal processor step 508 and a localize inflection point in reference motion pattern step 510. Thereafter the inflection point(s) from the image motion pattern step (504) and the inflection point(s) from the reference motion pattern step (510) are compared in a comparison step 506. If the reference and image inflection points match 512, the image is verified. If the reference and image inflection points differ 514, the image is not verified/authenticated, i.e., it fails verification/authentication. Failure to verify may occur for any number of reasons, such as when the image has been tampered with by other than the user who acquired the image.

Figure 6:
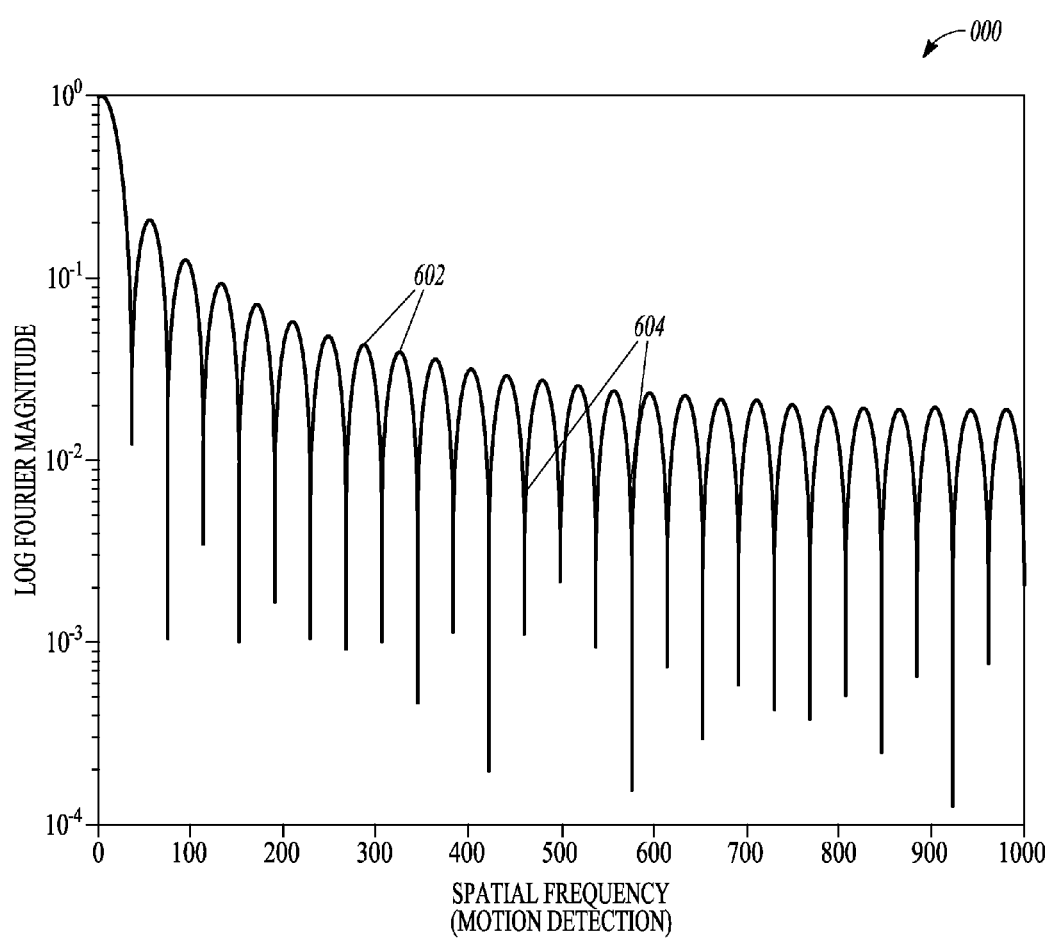
FIG. 6 is an illustration of a Fourier transform pattern which a motion pattern may generate according to an example embodiment.

The signal processor can perform spectral analysis based on fast Fourier transforms, time frequency analysis or combinations thereof. In one embodiment, the analysis is a Fast Fourier Transform (FFT) analysis which includes processing and comparing pixel intensities to produce a plot, such as the one shown in FIG. 6 which has peaks 602 and valleys 604. The exact positions and magnitudes of the peaks 602 and valleys 604 will depend on how fast the image device element is moving.

In one embodiment, a Gabor filter (linear filter used for edge detection) is used as a comparison against the acquired image as an indicator as to whether one of the values is at a particular location. Since frequency and orientation representations of the Gabor filter are similar to those of the human visual system, such filters are useful for texture representation and discrimination. In the spatial domain, a 2D Gabor filter is a Gaussian kernel function modulated by a sinusoidal plane wave. The Fourier transform of a Gabor filter's impulse response is the convolution of the Fourier transform of the harmonic function of the Fourier transform of the Gaussian function.

Figure 7:
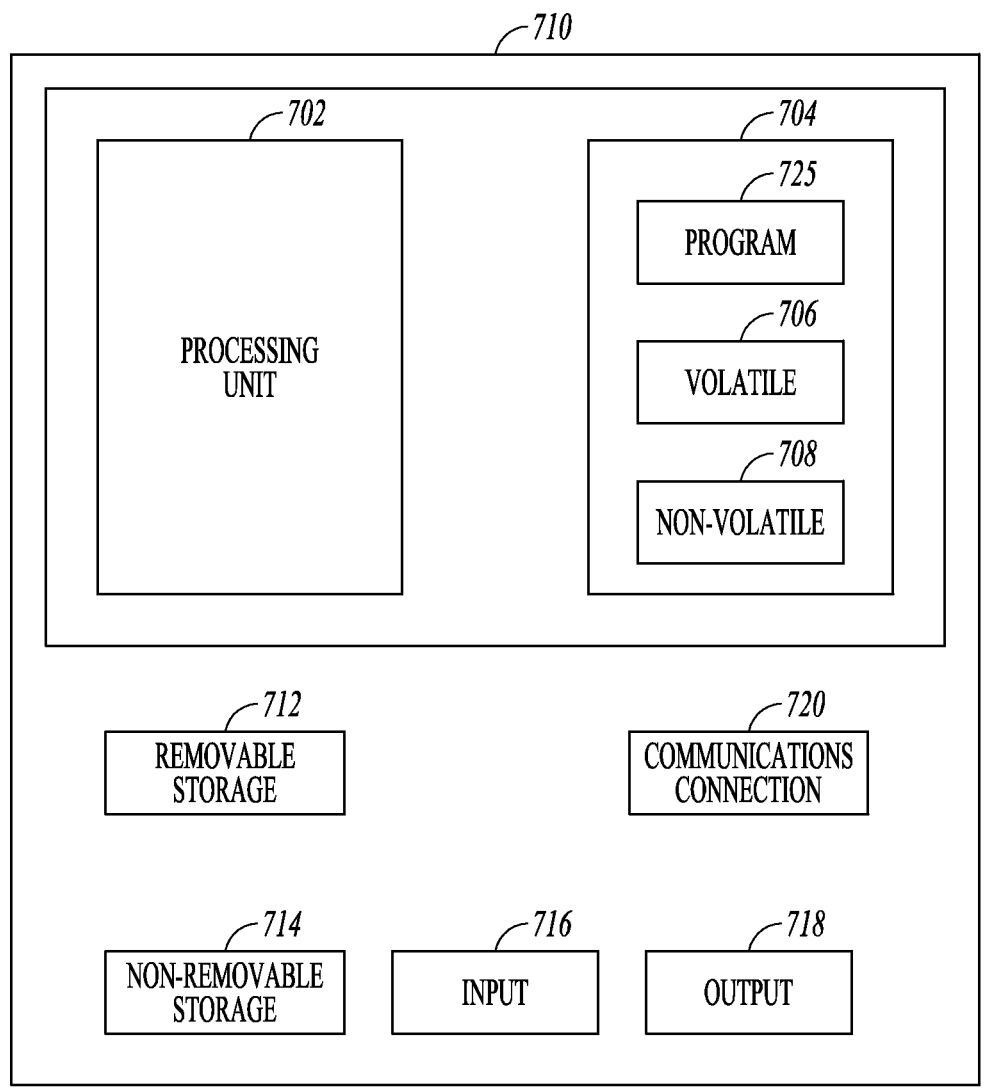
FIG. 7 is a block diagram of a computing device for implementing one or more algorithms according to an example embodiment.

A block diagram of a computer system that executes programming for performing the above algorithms of the diagnostics system is shown in FIG. 7. A general computing device in the form of a computer 710, may include a processing unit 702, memory 704, removable storage 712, and non-removable storage 714. Memory 704 may include volatile memory 706 and non-volatile memory 708. Computer 710 may include, or have access to a computing environment that includes, a variety of computer-readable media, such as volatile memory 706 and non-volatile memory 708, removable storage 712 and non-removable storage 714. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 710 may include or have access to a computing environment that includes input 716, output 718, and a communication connection 720. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 702 of the computer 710. A hard drive, CD-ROM, and RAM are some examples of articles including a computer-readable medium.

The Abstract is provided to comply with 37 C.F.R. §1.72(b) is submitted with the understanding that it will not be used to interpret or limit the scope or meaning of the claims.

The invention claimed is:

1. A computer implemented method comprising:
providing a motion pattern to an imaging device; and
acquiring an image with the imaging device, wherein the image has embedded signals representative of the motion pattern and the embedded signals provide an authenticating watermark, wherein the embedded signals comprise spectrum information selected from duration, dimension, acceleration and velocity.

2. The method of claim 1 wherein the imaging device has a sensor and a compound lens, the compound lens containing multiple single lens elements, and the motion pattern is produced when at least one of the multiple single lens elements moves in relation to the sensor during the acquiring step.

3. The method of claim 2 wherein the sensor moves in relation to the compound lens during the acquiring step.

4. The method of claim 1 wherein the imaging device has a single lens and a sensor and the motion pattern is produced when the sensor moves in relation to the single lens during the acquiring step.

5. The method of claim 1 wherein the motion pattern produces a visible watermark.

6. The method of claim 1 wherein the motion pattern produces an invisible watermark having embedded signals detectable in the frequency spectrum.

7. The method of claim 1 further comprising:
generating a motion pattern in an Internet-based central database; and
communicating the motion pattern to the imaging device.

8. The method of claim 7 wherein the communicating occurs using Bluetooth technology, USB technology, a flash drive, wireless network connection or removable memory chip.

9. The method of claim 7 wherein the imaging device has Internet access and the communicating occurs using a wired or wireless connection to the Internet.

10. The method of claim 1 further comprising analyzing the embedded signals to provide image verification.

11. The method of claim 10 wherein spectrum information in the embedded signals is generated by at least one of fast Fourier transforms and time frequency analysis and the method further comprises calculating spectral feature-based conclusions from the embedded signals to authenticate the acquired image.

12. The method of claim 11 wherein a Gabor filter is used as a comparison against the acquired image.

13. A computer implemented method comprising:
providing a motion pattern to an imaging device; and
acquiring an image with the imaging device, wherein the image has embedded signals representative of the motion pattern and the embedded signals provide an authenticating watermark, wherein the imaging device has a sensor and the providing step comprises:
inputting instructions into the sensor; and
translating the instructions into the motion pattern.

14. A non-transitory computer readable device having instructions to cause a computer system to implement a method comprising moving an imaging device according to a programmed motion pattern during image acquisition to produce signals embedded in an acquired image comprising an authenticating watermark,
wherein the programmed motion pattern is input by a motion pattern device, and wherein the motion pattern device is coupled to the imaging device and configured to accept instructions from a central database and translate the instructions into the motion pattern.

15. The non-transitory computer readable device of claim 14 wherein the imaging device has a sensor and a compound lens, the compound lens containing multiple single lens elements and the motion pattern is produced when at least one of the multiple single lens elements moves according to the programmed motion pattern in relation to the sensor.

16. The non-transitory computer readable device of claim 15 wherein the sensor moves in relation to the compound lens during the acquiring step.

17. The non-transitory computer readable device of claim 14 wherein the imaging device has a single lens and a sensor and the sensor moves during image acquisition according to the programmed motion pattern in relation to the single lens.

18. The non-transitory computer readable device of claim 14 further comprising:
extracting the signals from the programmed motion pattern, the signals based on information selected from duration, dimension., acceleration and velocity; and
calculating spectral feature based conclusions from the signals, wherein the acquired image is verified.

19. The non-transitory computer readable device of claim 15 further comprising extracting signals based on acceleration.

20. The non-transitory computer readable device of claim 19 wherein the imaging device includes image storage for storing multiple acquired images.

21. A system comprising:
an imaging device having a sensor and a lens;
a motion pattern device for inputting a motion pattern into the imaging device, wherein the motion pattern has specific starting and ending points at a predefined location within an acquired image; and
a shutter release mechanism coupled to the imaging device to acquire an image having the motion pattern, wherein the motion pattern produces an authenticating watermark, wherein the motion pattern device is coupled to the imaging device and configured to accept instructions from a central database and translate the instructions into the motion pattern.

22. A system comprising:
an imaging device having a sensor and a lens;
a motion pattern device for inputting a motion pattern into the imaging device, wherein the motion pattern has specific starting and ending points at a predefined location within an acquired image; and
a shutter release mechanism coupled to the imaging device to acquire an image having the motion pattern, wherein the motion pattern produces an authenticating watermark, wherein the signal processor analyzes spectrum information in the acquired image generated by at least one of fast Fourier transforms and time frequency analysis.

23. The system of claim 21 wherein the signals provide information about the motion pattern selected from duration, dimension, acceleration and velocity.

24. The system of claim 21 further comprising a signal processor coupled to the imaging device to receive signals from the imaging device.

25. The system of claim 21 wherein the imaging device is a single lens reflex (SLR) digital camera.

* * * * *